US007672862B1

(12) United States Patent
Venkatasubramanyan et al.

(10) Patent No.: US 7,672,862 B1
(45) Date of Patent: Mar. 2, 2010

(54) GENERATING A SUPPLY CHAIN PLAN

(75) Inventors: Narayan Venkatasubramanyan, Coppell, TX (US); Manoj Abraham, Dallas, TX (US); David Michael, Dallas, TX (US); Mehdi Sheikhzadeh, Irving, TX (US)

(73) Assignee: i2 Technologies US, Inc., Dallas, TX (US)

( * ) Notice: Subject to any disclaimer, the term of this patent is extended or adjusted under 35 U.S.C. 154(b) by 1386 days.

(21) Appl. No.: 10/004,725

(22) Filed: Dec. 4, 2001

Related U.S. Application Data

(60) Provisional application No. 60/281,144, filed on Apr. 2, 2001.

(51) Int. Cl.
*G06F 9/46* (2006.01)
(52) U.S. Cl. .......................................................... 705/8
(58) Field of Classification Search ..................... 705/7, 705/8
See application file for complete search history.

(56) References Cited

U.S. PATENT DOCUMENTS

| | | | | | |
|---|---|---|---|---|---|
| 5,237,497 | A | * | 8/1993 | Sitarski | 705/8 |
| 5,343,388 | A | * | 8/1994 | Wedelin | 705/8 |
| 5,946,662 | A | * | 8/1999 | Ettl et al. | 705/8 |
| 6,006,192 | A | * | 12/1999 | Cheng et al. | 705/7 |
| 6,041,267 | A | * | 3/2000 | Dangat et al. | 700/107 |
| 6,047,290 | A | * | 4/2000 | Kennedy et al. | 707/103 R |
| 6,049,742 | A | * | 4/2000 | Milne et al. | 700/99 |
| 6,151,582 | A | * | 11/2000 | Huang et al. | 705/8 |
| 6,321,207 | B1 | * | 11/2001 | Ye | 705/8 |
| 6,341,266 | B1 | * | 1/2002 | Braun | 705/7 |
| 6,374,227 | B1 | * | 4/2002 | Ye | 705/8 |
| 6,671,673 | B1 | * | 12/2003 | Baseman et al. | 705/7 |
| 6,904,421 | B2 | * | 6/2005 | Shetty | 706/13 |
| 7,003,475 | B1 | * | 2/2006 | Friedland et al. | 705/9 |
| 7,058,587 | B1 | * | 6/2006 | Horne | 705/7 |
| 7,177,827 | B1 | * | 2/2007 | Abraham | 705/28 |
| 2002/0143603 | A1 | * | 10/2002 | Moore | 705/10 |
| 2002/0156663 | A1 | * | 10/2002 | Weber et al. | 705/7 |

OTHER PUBLICATIONS

Hillier, Frederick S., et al., "Introduction to Operations Research", McGraw-Hill, Inc., 1995, 6$^{th}$ Edition, pp. 25-26, 65-68, 356-359, 368, 511-532.*

(Continued)

*Primary Examiner*—Jonathan G. Sterrett
*Assistant Examiner*—Peter Choi
(74) *Attorney, Agent, or Firm*—Booth Udall, PLC; Steven J. Laureanti

(57) ABSTRACT

Generating a supply chain plan includes accessing data describing a supply chain network having buffers. Each buffer is operable to store items and is associated with a corresponding time variable. The supply chain network is constrained by a constraint. A linear programming problem is generated for the supply chain network. The linear programming problem is approximated by discretizing the time variables of the buffers to yield discretized time variables and by relaxing the constraint to yield a relaxed constraint. An optimized supply chain plan is calculated for the approximated linear programming problem. The optimized supply chain plan describes a quantity of items at each buffer for at least one time value of the corresponding time variable. The optimized supply chain plan is adjusted to satisfy the constraint.

54 Claims, 5 Drawing Sheets

OTHER PUBLICATIONS

Sheikhzadeh, Mehdi, et al., "Design of Flexible Plant Layouts", IIE Transactions, Apr. 2000 [retrieved Mar. 18, 2006], 19 pages, retrieved from: Dialog, file 148.*

Grackin, Ann, et al., "Make Better Schedules: Planning and scheduling tools are improving", InformationWeek, Apr. 21, 1997 [retrieved Mar. 18, 2006], pp. 1-4, retrieved from: Dialog, file 148.*

* cited by examiner

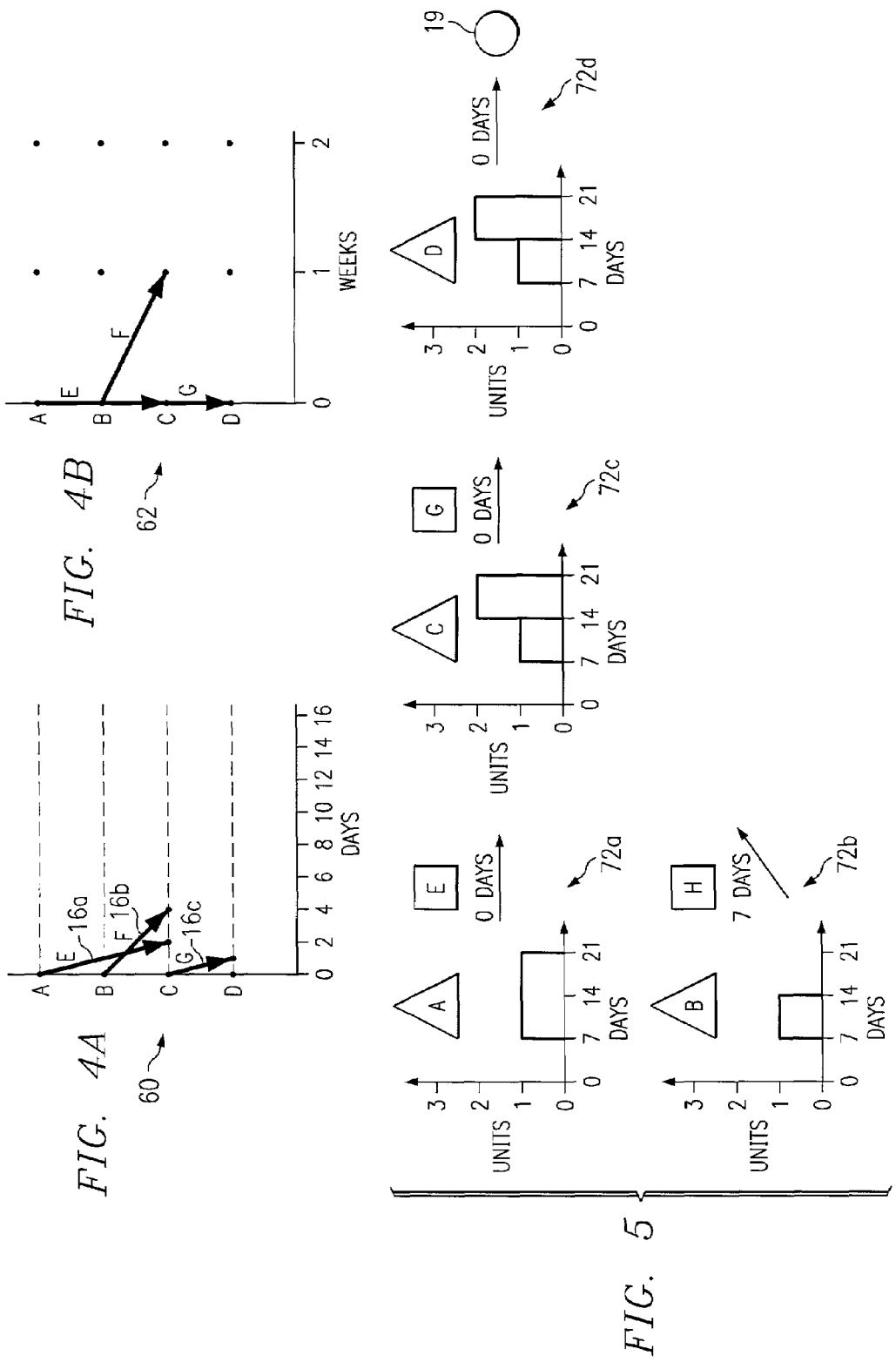

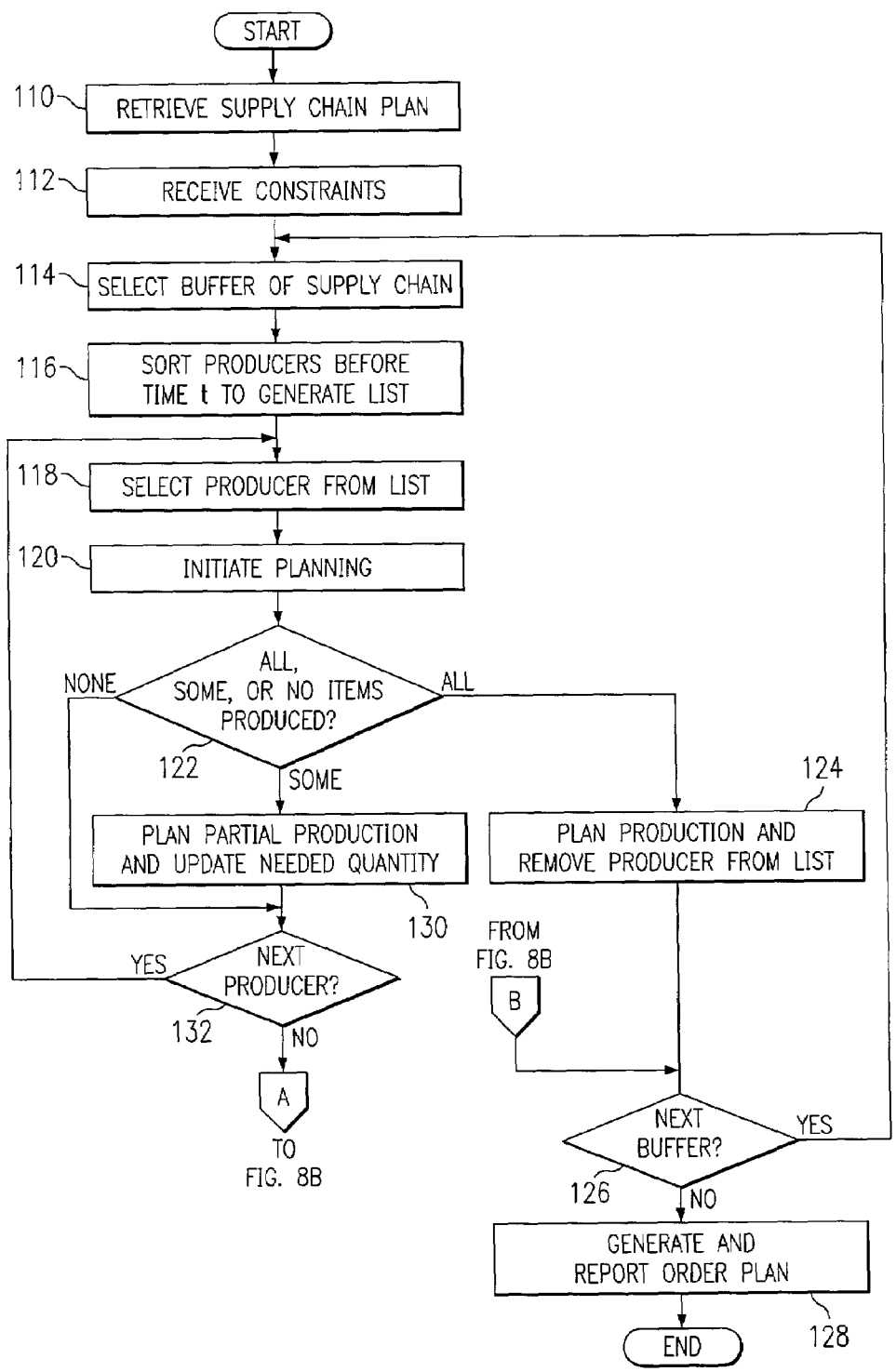

GENERATING A SUPPLY CHAIN PLAN

RELATED APPLICATIONS

This application claims benefit under 35 U.S.C. §119(e) of U.S. Provisional Application Ser. No. 60/281,144, filed Apr. 2, 2001, entitled "COMBINING HEURISTICS AND LINEAR PROGRAMMING FOR LARGE SCALE AND COMPLEX SUPPLY CHAIN PLANNING PROBLEMS."

TECHNICAL FIELD OF THE INVENTION

This invention relates generally to the field of supply chain networks and more specifically to generating a supply chain plan.

BACKGROUND OF THE INVENTION

A supply chain plan describes items to be procured and operations to be performed by a supply chain network in order to deliver a product to a customer. Constraints may be placed on a supply chain network, for example, limitations on the availability of materials from a supplier. Due to constraints, a supply chain network may not be able to satisfy all customer demand, and some customer demand may have to be delayed in order to maximize overall customer satisfaction. As a result, generating a supply chain plan that optimizes customer satisfaction while respecting constraints of the supply chain network poses a challenge for supply chain network managers.

SUMMARY OF THE INVENTION

In accordance with the present invention, a system, method, and logic for generating a supply chain plan are provided that substantially eliminate or reduce the disadvantages and problems associated with previous techniques.

According to one aspect of the present invention, generating a supply chain plan includes accessing data describing a supply chain network having buffers. Each buffer is operable to store items and is associated with a corresponding time variable. The supply chain network is constrained by a constraint. A linear programming problem is generated for the supply chain network. The linear programming problem is approximated by discretizing the time variables of the buffers to yield discretized time variables and by relaxing the constraint to yield a relaxed constraint. An optimized supply chain plan is calculated for the approximated linear programming problem. The optimized supply chain plan describes a quantity of items at each buffer for at least one time value of the corresponding time variable. The optimized supply chain plan is adjusted to satisfy the constraint.

Certain embodiments of the invention may provide one or more technical advantages. A technical advantage of certain embodiments may be that approximations may be made to a supply chain planning problem in order to formulate a linear programming problem from a non-linear programming problem. Linear programming may be used to solve optimization problems where constraints as well as an objective function are linear. In real life situations, however, the constraints or objective function may not be linear. For example, variables such as the quantity of an item may be restricted to discrete values such as integer value lot sizes. Non-linear constraints or objective functions may be approximated as linear functions in order to formulate a linear programming problem.

Another technical advantage of certain embodiments may be that approximations may be made to a supply chain planning problem to reduce the complexity of the linear programming problem. For example, a continuous time variable may be replaced by discrete instants separated by time intervals. An activity of a supply chain network may be approximated to occur at one of the instants. A lead time for an activity may be approximated to be multiples of time intervals. For example, if the time interval is a week, a three day lead time may be approximated as a zero day lead time, and a five day lead time may be approximated as a one week lead time. Reducing the complexity of the linear programming problem may minimize the time required to solve the liner programming problem.

Another technical advantage of certain embodiments may be providing a heuristic solver that may be used to adjust a supply chain plan generated from an approximated linear programming problem in order to satisfy constraints associated with a supply chain network. A solution to an approximated linear programming problem may be infeasible due to the approximations. For example, if an integer value lot size requirement may not be modeled in an approximated linear programming problem, then the quantities of the solution may not use integer values. A heuristic solver may be used to adjust the supply chain plan to satisfy constraints associated with the supply chain network.

One or more other technical advantages may be readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 4A is a diagram illustrating continuous time variables;

FIG. 4B illustrates one example of a time grid with discrete time variables;

FIG. 5 illustrates one example of buffer profiles that represent a buffer plan that may be used to describe a supply chain plan;

DETAILED DESCRIPTION OF THE DRAWINGS

Examples of the present invention and its advantages are best understood by referring to FIGS. 1 through 8 of the drawings, like numerals being used for like and corresponding parts of the various drawings.

Figure 1:
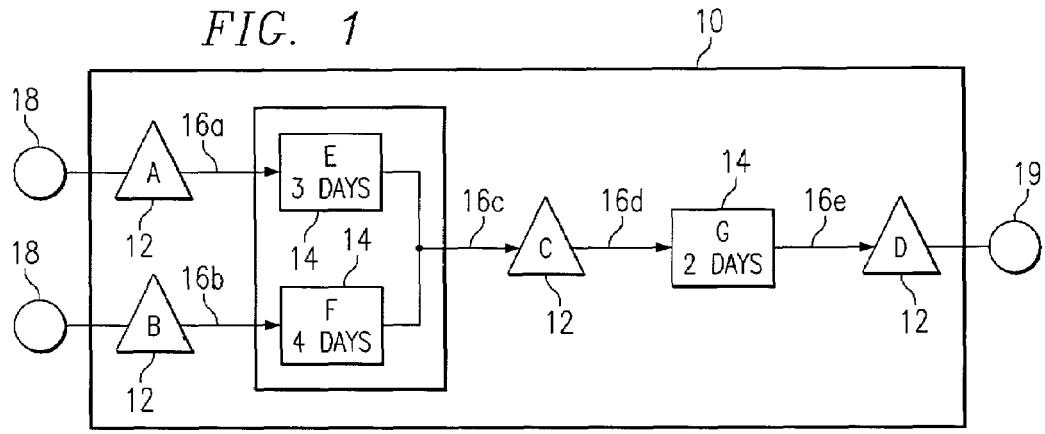
FIG. 1 illustrates one example of a supply chain network.

FIG. 1 illustrates one example of a supply chain network 10. Supply chain network 10 may describe the flow of items such as materials and products through an organization 11 such as a company. Supply chain network 10 includes buffers 12, operations 14, and transitions 16. Buffers 12 represent storage locations for items, and may receive items as input, store items, and transmit items as output. In the illustrated example, buffers 12 are labeled buffers A, B, C, and D. Buffers A and B may comprise supplier side buffers that receive materials from suppliers 18, and buffer D may comprise a customer side buffer that distributes a product to customer 19.

Operations 14 represent processes that are performed on the items as they flow through supply chain network 10. An operation 14 may comprise, for example, transforming an intermediate product into a finished product. In the illustrated example, operations 14 are labeled operations E, F, and G. A buffer 12 or operation 14 that provides items may be referred to as a producer. Transitions 16 indicate the flow of items through supply chain network 10. For example, transition 16a represents items flowing from buffer A to operation E. Downstream describes the direction from suppliers 18 to customer 19, and upstream describes the direction from customer 19 to suppliers 18.

Operations 14 are associated with a lead time that may represent the time required to perform an operation. For example, operation E is associated with a three day lead time, operation F is associated with a four day lead time, and operation G is associated with a two day lead time. Lead times may be used to determine the time required for an item to go from one buffer to another buffer. For example, an item flowing from buffer A to buffer C takes three days, since operation E takes three days to complete. Similarly, an item takes four days to flow from buffer B to buffer C, and an item takes two days to flow from buffer C to buffer D. Items may be manufactured and distributed by supply chain network 10 to satisfy a customer demand, which may be represented as a quantity of items required by customer 19 on or by a due date.

Supply chain planning involves determining a supply chain plan that describes items to be procured and operations to be performed in order to deliver a product to customer 19 by a due date. There may be more than one way to manufacture and distribute a product to satisfy a customer demand. For example, there may be multiple suppliers 18, buffers 12, and operations 14 from which to select. Proper selection may improve the efficiency of providing a product to customer 19. Supply chain planning may consider constraints on supply chain network 10, for example, limitations on the availability of materials from suppliers 18 or the capacity of buffers 12. Due to constraints, supply chain network 10 may not be able to satisfy all customer demand, and some customer demand may have to be delayed in order to maximize overall customer satisfaction. Supply chain planning may evaluate and select solutions based on the objectives of organization 11. Objectives may include, for example: maximize demand satisfaction, minimize inventory, and maximize use of preferred alternates.

A solution to a supply chain planning problem may include a supply chain plan represented by a set of operation plans or a set of buffer plans. An operation plan specifies operations to be performed across a time horizon. A buffer plan specifies input into buffers 12 and output out of buffers 12 across a time horizon. A supply chain plan may be used to generate an order plan. An order plan specifies items flowing through supply chain 10 that satisfy a specific customer demand.

Figure 2:
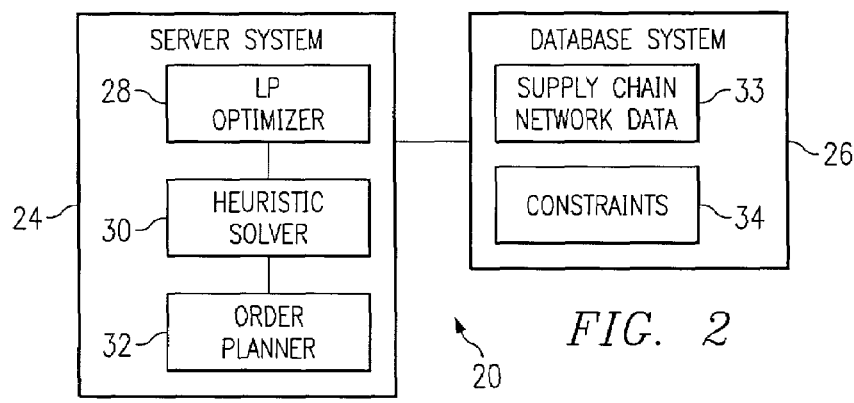
FIG. 2 illustrates one example of a system for generating a supply chain plan for a supply chain network.

FIG. 2 illustrates one example of a system 20 for generating a supply chain plan for supply chain network 10. System 20 includes a server system 24 coupled to a database system 26 that stores supply chain network data 33 and constraints 34. Server system 24 may include one or more computers at one or more locations and associated input devices, output devices, mass storage media, processors, memory, or other components for receiving, processing, storing, and communicating information according to the operation of system 20. Database system 26 may include one or more databases or other data storage arrangements at one or more locations local to or remote from server system 24.

Server system 24 manages applications that generate a supply chain plan and an order plan for supply chain network 10. Server system 24 includes a linear programming (LP) optimizer 28, a heuristic solver 30, and an order planner 32. LP optimizer 28 may be used to generate an optimized supply chain plan for an approximation of a supply chain planning problem using a linear programming technique. Linear programming may be used to solve optimization problems where constraints 34 as well as the objective function are linear. In real-life situations, however, constraints 34 or the objective function may not be linear. For example, variables such as the quantity of an item may be restricted to discrete values such as integer value lot sizes. Additionally, as the size of a linear programming problem grows, the computational power and time required to solve the linear programming problem may also increase.

Approximations may be made to a supply chain planning problem in order to formulate a linear programming problem and to reduce the complexity of the linear programming problem. Non-linear constraints 34 or objective functions may be approximated as linear functions. For example, the requirement that certain variables are discrete values may be relaxed. A continuous time variable may be replaced by discrete instants separated by time intervals in order to reduce the complexity of a linear programming problem. An activity may be approximated to occur at one of the instants. Lead times may be approximated to be multiples of time intervals. For example, if the time interval is a week, then the lead times may be approximated to be multiples of weeks. A three day lead time may be approximated as a zero day lead time, and a five day lead time may be approximated as a one week lead time.

The linear programming solution to an approximated supply chain planning problem, however, may be infeasible due to the approximations. Infeasibilities may be due to relaxing non-linearity requirements. For example, if the integer value lot size requirement is not modeled in the linear programming problem, the quantities of the linear programming solution may not use integer values. Infeasibilities may also be due to replacing a continuous time variable with discrete time variables. Discretizing time may result in under-estimation or over-estimation of lead time, which may result in material shortages or excess. Lead time approximations may also result in early production or unnecessary delay. Heuristic solver 30 may be used to adjust a supply chain plan optimized by LP optimizer 28 in order to satisfy constraints 34 associated with supply chain network 10. Order planner 32 may be used to generate an order plan using an adjusted supply chain plan from heuristic solver 30 or by using an optimized linear programming solution from LP optimizer 28.

Database system 26 stores data that may be used by server system 24. Database system 26 may include, for example, supply chain network data 33 and constraints 34. Supply chain network data 33 describes supply chain network 10. Constraints 34 describe constraints applied to supply chain network 10. Constraints 34 may include, for example, lead time constraints that describe the time required for an operation 14 to supply items to a buffer 12, a lot size constraint that defines a quantity of items that may be transferred to or from a buffer 12, and/or a capacity constraint that describes a maximum quantity of items that may be produced or stored.

Figure 3:
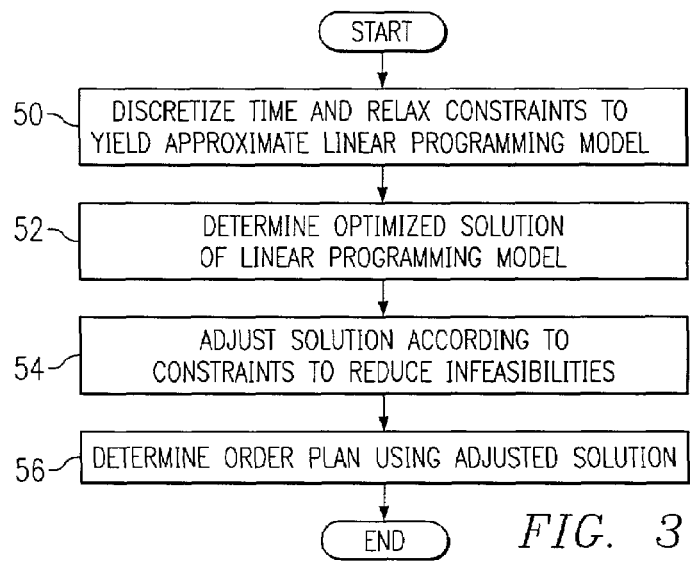
FIG. 3 illustrates one example of a method for generating a supply chain plan.

FIG. 3 illustrates one example of a method for generating a supply chain plan. At step 50, LP optimizer 28 initiates the method by discretizing a time variable and relaxing constraints 34 to yield an approximate linear programming problem. Discretizing a time variable is described in more detail with reference to FIGS. 4A and 4B. LP optimizer 28 determines an optimized solution of the approximate linear programming problem at step 52. At step 54, heuristic solver 30 adjusts the solution according to constraints 34 in order to reduce or eliminate infeasibilities. A method for adjusting the solution is described in more detail in reference to FIG. 7. At step 56, order planner 32 determines an order plan using the optimized solution of the approximate linear programming problem or using the adjusted solution. After determining the order plan, order planner 32 terminates the method.

FIG. 4A is a diagram 60 illustrating continuous time variables. Diagram 60 includes a continuous time variable for each of the buffers A, B, C, and D. "Each" as used in this document refers to each member of a set or each member of a subset of the set. Transitions 16 are associated with lead times for items going from one buffer 12 to another buffer 12. For example, transitions 16a and c represent a three day lead time for an item going from buffer A to buffer C through operation E. Similarly, transitions 16b and c represent a four day lead time for an item going from buffer B to buffer C through operation F, and transition 16d and e represent a two day lead time for an item going from buffer C to buffer D through operation G.

FIG. 4B illustrates one example of a time grid 62 with discrete time variables. A continuous time variable is discretized by dividing the continuous time variable into discrete instants that occur at time intervals. In the illustrated example, a continuous time variable is divided into weekly intervals. The lead times are adjusted to occur at the discrete instants, and may be rounded to the nearest discrete instant. In the illustrated example, the three day lead time for operation E is rounded to zero weeks. Similarly, the four day lead time for operation F is rounded to one week, and two day lead time for operation G is rounded to zero weeks.

FIG. 5 illustrates one example of buffer profiles 72 that represent a buffer plan that may be used to describe a supply chain plan. In the illustrated example, buffers A and B receive supplies from suppliers 18 and supply items operations E and F, which produce items for to buffer C. Buffer C in turn supplies items to operation H, which uses the items to produce items for buffer D. Buffer D supplies products to customer 19. Each buffer profile 72 describes a quantity of items at a buffer 12 across a time horizon. For example, graph 72a illustrates a quantity of items at buffer A at weekly intervals, and graph 72b describes a quantity of items at buffer B at weekly intervals.

Figure 6:
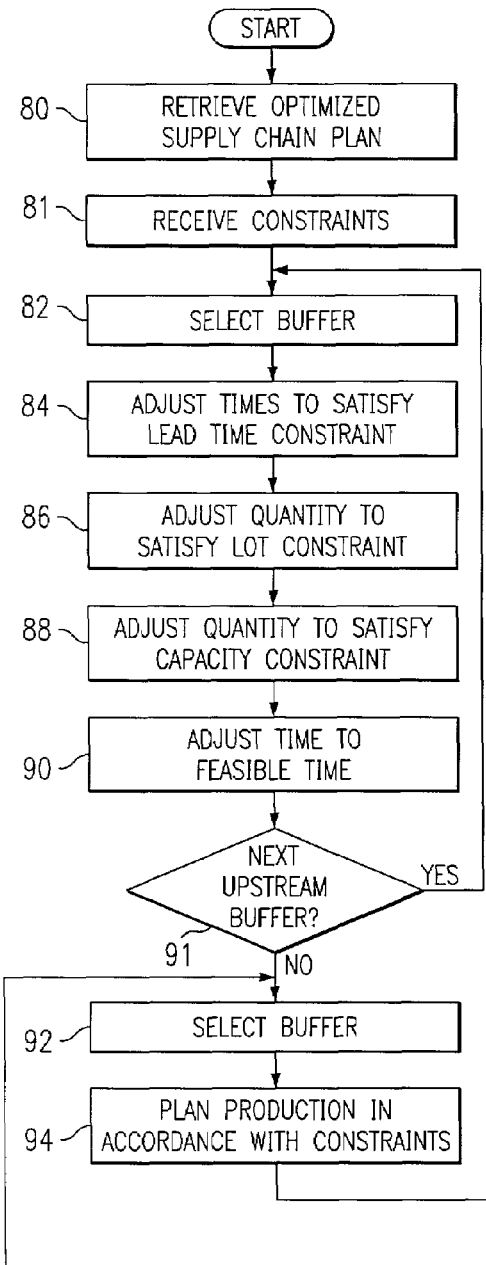
FIG. 6 illustrates one example of a method for adjusting an optimized supply chain plan.

FIG. 6 illustrates one example of a method for adjusting an optimized supply chain plan to accommodate constraints 34. Heuristic solver 30 initiates the method at step 80 by retrieving an optimized supply chain plan from LP optimizer 28. At step 81, constraints 34 are received from database system 26. Constraints 34 may include, for example, a lead time constraint that describes a time required to perform an operation that supplies a buffer 12, a lot size constraint that defines a quantity of items that may be transferred from one buffer 12 to another buffer 12, and/or a capacity constraint that describes a maximum quantity of items that may be stored or produced. The optimized supply chain plan may have been calculated from a linear programming problem that approximated constraints 34. For example, lead times may have been discretized from daily intervals to weekly intervals, and lot size constraints and capacity constraints may have been linearized.

Steps 82 through 91 may be performed in an upstream direction, starting from buffer D and ending at buffers A and B. At step 82, a buffer 12 is selected. Buffer D, which comprises a customer side buffer 12, may be selected. A customer side buffer 12 may be initially selected in order to determine the items required by customer 19.

At step 84, times are adjusted to satisfy lead time constraints. The approximation of the linear programming problem may discretize lead times, for example, from lead times expressed in days to lead times discretized to the nearest week. For example, the two day lead time for operation G may be approximated as zero weeks. The times when the items are in a buffer 12 are adjusted to reflect non-discretized lead times. For example, buffer D may require items at day 7. To accommodate a two day lead time of operation G, buffer C supplies items at day 5, so buffer D can receive the items at day 7. Adjusting the times at one buffer 12 may require adjustment of the times at another buffer 12. For example, to accommodate a three day lead time for operation E, buffer A supplies items at day 2 so that buffer C can receive the items at day 5.

The quantities of items are adjusted at step 86 to satisfy lot constraints. A lot constraint may, for example, restrict lot sizes to two units of items. The quantity of items may be adjusted starting from an upstream producer, for example, buffers A and B, and proceeding in a downstream direction. The quantities may be adjusted according to a lot size rule stating that the quantities are rounded down to satisfy a lot size constraint if the quantity of items required by buffer 12 is supplied. Otherwise, the quantities are rounded up to satisfy a lot size constraint. For example, zero units of items or two units of items may be sent to buffer A to satisfy a two-unit lot size constraint. A lot size of zero units, however, might not satisfy buffer A's requirement of one unit. Accordingly, the lot size is rounded up to two units.

Quantities are adjusted to satisfy capacity constraints at step 88. Starting with downstream buffer D and moving upstream towards buffers A and B, capacity constraints may be satisfied by pushing production to another producer. For example, if buffer B does not have the capacity to supply items to buffer C, buffer A may be used to supply the items to buffer C.

During adjustments made at step 84 to accommodate lead times, items may be planned to be supplied earlier than feasible thus violating a feasible time constraint. For example, a delivery time may have been moved to a time in the past to accommodate a lead time. At step 90, the delivery times are moved to feasible times. For example, the delivery time that was in the past is moved to a current or future time. At step 91, heuristic solver 30 determines whether there is a next upstream buffer. If there is a next upstream buffer, heuristic solver 30 returns to step 82 to select the next upstream buffer. If there is no next upstream buffer, heuristic solver 30 proceeds to step 92.

Steps 92 through 97 may be performed in a downstream direction starting from buffers A and B and ending at buffer D. Steps 92 through 97 may be performed to reduce conflicts with constraints 34. For example, the steps may be performed to reduce conflicts that may have been created at step 90 when a delivery time was moved to a feasible time. Buffer A is selected at step 92. At step 94, a producing operation for the selected buffer A is planned in accordance with constraints 34. At step 95, heuristic solver 30 determines whether there is a remaining quantity of items to be produced. If there is a remaining quantity of items to be produced, heuristic solver 30 proceeds to step 96 to delay planning of the remaining quantity until a next buffer 12 or to delay delivery to customer 19. If there is no remaining quantity to be produced, heuristic solver 30 proceeds to step 97 to determine whether there is a next downstream buffer 12. If there is a next downstream buffer 12, the method proceeds to step 92 to select the next downstream buffer 12. If there is no next downstream buffer 12, heuristic solver 30 proceeds to step 98 to generate and report the adjusted supply chain plan. After reporting, heuristic solver 30 terminates the method.

Figure 7:
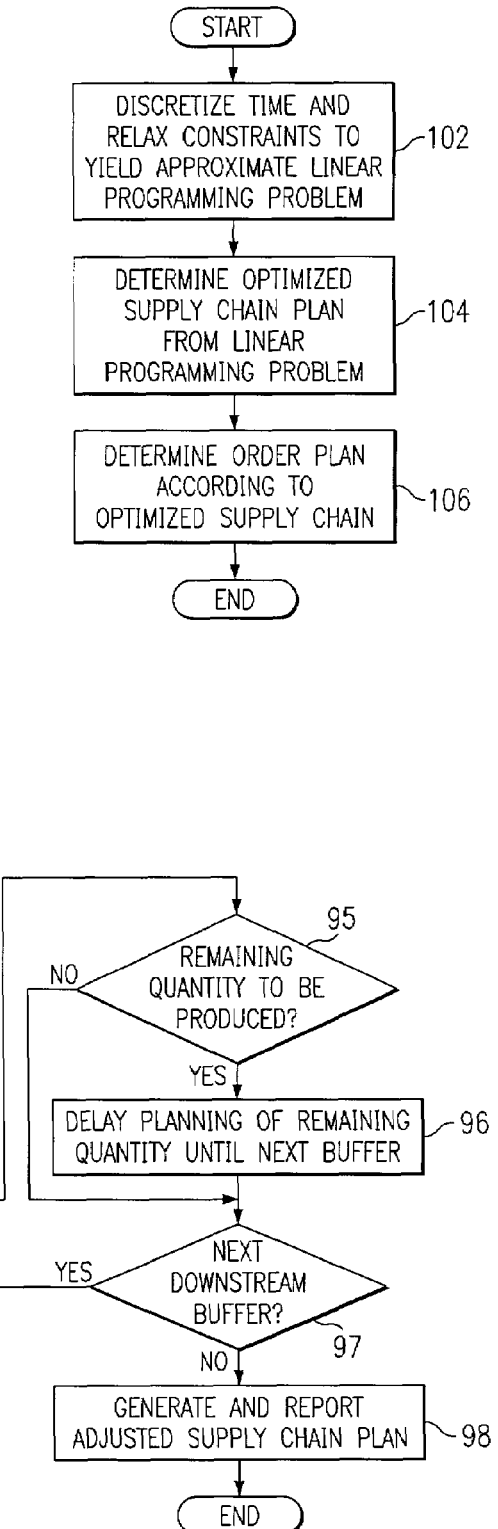
FIG. 7 illustrates one example of a method for generating an order plan for supply chain.

FIG. 7 illustrates one example of a method for generating an order plan for a supply chain. LP optimizer 28 initiates the method at step 102 by discretizing time and relaxing constraints 34 to yield an approximate linear programming problem. An approximate linear programming problem may be calculated in a method similar to that described in step 50 of FIG. 3. At step 104, an optimized supply chain plan to the linear programming problem is determined. At step 106, order planner 32 determines an order plan using suggestions from the optimized supply chain plan. A method for determining an order plan is described with reference to FIG. 9.

Figure 8B:
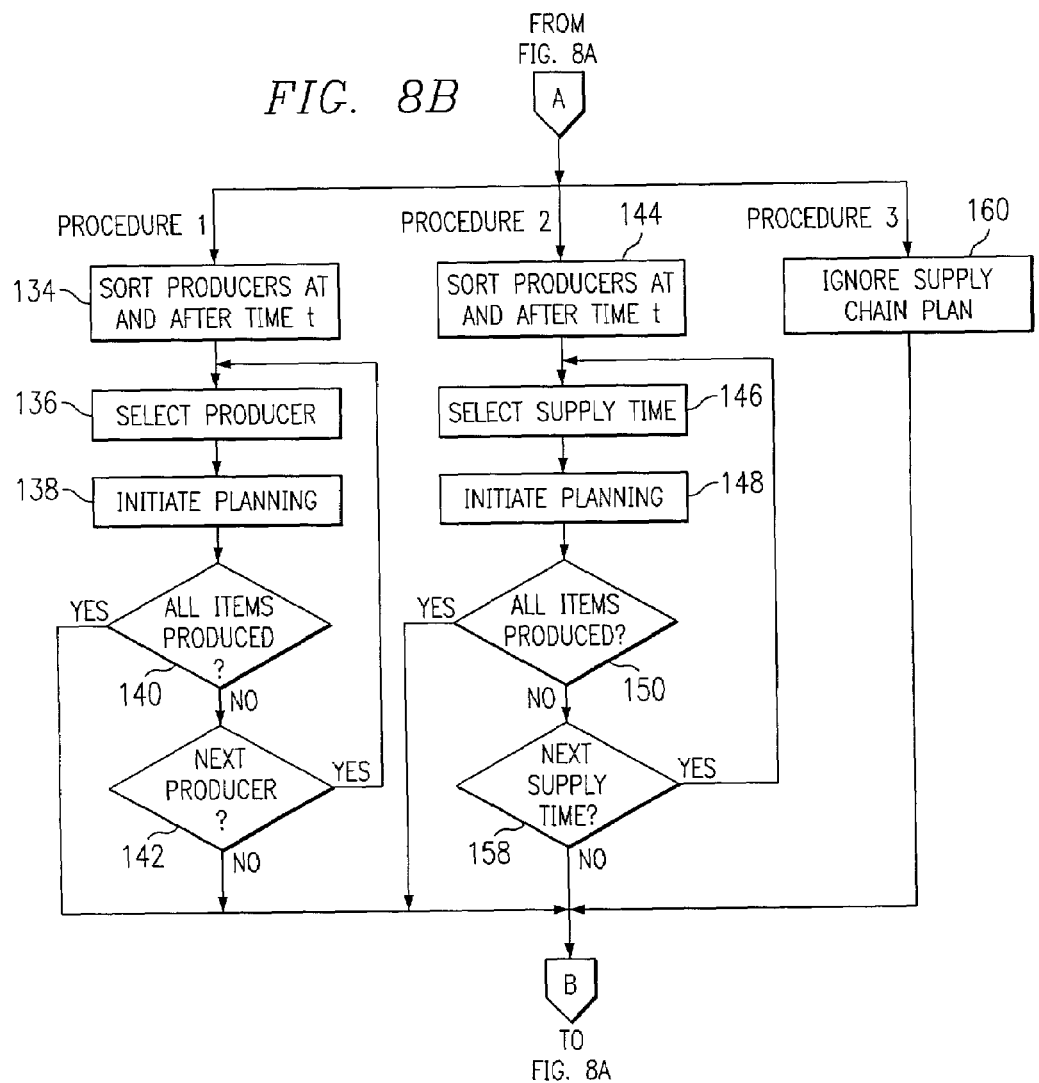
FIG. 8 illustrates one example of a more detailed method for generating an order plan.

FIG. 8 illustrates one example of a method for generating an order plan using suggestions from an optimized supply chain plan. Order planner 32 initiates the method at step 110 by retrieving an optimized supply chain plan from LP optimizer 28. The supply chain plan may describe producers such as buffers 12 or operations 14 that can provide items to buffers 12. A producer may provide specific quantities of items across a time horizon. The supply chain plan may describe multiple possible producers, in order of preference, and the amount of items across a time horizon that each producer may be able to supply. The amount a producer may actually provide, once constraints 34 have been considered, may differ from the amount suggested by the supply chain plan. Order planner 32 receives constraints 34 from database system 26 at step 112. At step 114, order planner 32 selects a buffer 12 from supply chain 10. Order planner 32 may start at a downstream buffer 12 such as customer side buffer D and end at upstream buffers 12 such as supply side buffers A and B. Buffer D may require items at a time t. To plan production of the items, producers of the items before time t are sorted at step 116 to generate a list. Producers may be sorted in the order of preference according to the supply chain plan and then in reverse chronological order.

At step 118, the first producer is selected from the list. Production planning of the items for buffer D by the selected producer is initiated with respect to constraints 34 at step 120. At step 122, order planner 32 determines whether the producer can produce substantially all, some, or none of the items for buffer D. If substantially all of the items can be produced, order planner 32 plans production and removes the producer from the list at step 124. At step 126, order planner 32 determines whether there is a next buffer 12. If there is a next buffer 12 at step 126, order planner 32 returns to step 114 to select the next buffer 12. If there is no next buffer 12, order planner 32 proceeds to step 128 to generate and report an order plan. The order plan may include the producers that produce items for buffers 12 to satisfy a customer order. After reporting the order plans, order planner 32 terminates the method.

If some of the items can be supplied by the producer at step 122, order planner 32 proceeds to step 138 to plan partial production and to update the quantity required by buffer D to reflect the partial amount provided by the producer. Order planner 32 then proceeds to step 132. If no items can be produced at step 122, order planner 32 proceeds directly to step 132.

At step 132, order planner 32 determines whether there is a next producer on the list. If there is a next producer, order planner 32 returns to step 118 to select the next producer. If there is no next producer, the method may perform none, some, or all of the following procedures in any suitable order. According to a first procedure, order planner 32 proceeds to step 134 to sort producers suggested by the supply chain plan at or after time t to generate a list. The producers may be sorted according to preference and in chronological order. At step 136, a producer is selected from the list. Production planning with respect to constraints 34 is initiated at step 138 using the selected producer. At step 140, order planner 32 determines whether substantially all items have been produced. If substantially all items have been produced, order planner 32 returns to step 126 to determine whether there is a next buffer 12. If substantially all items have not been produced, order planner 32 proceeds to step 142 to determine whether there is a next producer. If there is no next producer, order planner 32 returns to step 126 to determine whether there is a next buffer 12. In this situation, the production of items for the selected buffer 12 may not satisfy a required number of items. If there is a next producer, order planner 32 returns to step 136 to select the next producer. Order planner 32 then proceeds to step 126 to determine whether there is a next buffer 12.

According to a second procedure, order planner 32 proceeds to step 144 to sort producers suggested by the supply chain at or after time t to generate a list. The producers may be sorted according to preference and in chronological order. The list describes the producers and the supply times at which the producers may provide items to the selected buffer 12. At step 146, a supply time is selected from the list. Production is planned with respect to constraints 34 at step 148 using the producer that can supply the items at the selected supply time. At step 150, order planner 32 determines whether substantially all items have been produced. If substantially all items have been produced, order planner 32 returns to step 126 to determine whether there is a next buffer 12. If substantially all items have not been produced, order planner 32 proceeds to step 158 to determine whether there is a next supply time of the list. If there is no next supply time, order planner 32 returns to step 126 to determine whether there is a next buffer 12. In this situation, the production of items for the selected buffer 12 may not satisfy a required number of items. If there is a next supply time, order planner returns to step 146 to select a next supply time. Order planner 32 then proceeds to step 126 to determine whether there is a next buffer 12.

According to a third procedure, order planner 32 proceeds to step 160. At step 160, order planner 32, ignores the supply chain plan recommendations and plans the order plan according to its own rules. Order planner 32 then proceeds to step 126 to determine whether there is a next buffer.

Certain embodiments of the invention may provide one or more technical advantages. A technical advantage of certain embodiments may be that approximations may be made to a supply chain planning problem in order to formulate a linear programming problem from a non-linear programming problem. Linear programming may be used to solve optimization problems where constraints as well as an objective function are linear. In real life situations, however, the constraints or objective function may not be linear. For example, variables such as the quantity of an item may be restricted to discrete values such as integer value lot sizes. Non-linear constraints or objective functions may be approximated as linear functions in order to formulate a linear programming problem.

Another technical advantage of certain embodiments may be that approximations may be made to a supply chain planning problem to reduce the complexity of the linear programming problem. For example, a continuous time variable may be replaced by discrete instants separated by time intervals. An activity of a supply chain network may be approximated to occur at one of the instants. A lead time for an activity may be approximated to be multiples of time intervals. For example, if the time interval is a week, a three day lead time may be approximated as a zero day lead time, and a five day lead time may be approximated as a one week lead time. Reducing the complexity of the linear programming problem may minimize the time required to solve the liner programming problem.

Another technical advantage of certain embodiments may be providing a heuristic solver that may be used to adjust a supply chain plan generated from an approximated linear programming problem in order to satisfy constraints associated with a supply chain network. A solution to an approximated linear programming problem may be infeasible due to the approximations. For example, if an integer value lot size requirement may not be modeled in an approximated linear programming problem, then the quantities of the solution may not include integer values. A heuristic solver may be used to adjust the supply chain plan to satisfy constraints associated with the supply chain network.

Although an example of the invention and its advantages are described in detail, a person skilled in the art could make various alterations, additions, and omissions without departing from the spirit and scope of the present invention as defined by the appended claims.

What is claimed is:

1. A computer-implemented method of generating a supply chain plan and using the supply chain plan to generate an order plan, comprising:

accessing, by a server, data in a database describing a supply chain network comprising a plurality of buffers, each buffer configured to store a plurality of items and associated with a corresponding time variable, the supply chain network constrained by one or more constraints selected from the group consisting of a lead time constraint, a lot size constraint and a capacity constraint;

generating, by the server, a linear programming problem for the supply chain network;

approximating, by the server, the linear programming problem by discretizing the corresponding time variables of the buffers to yield a plurality of discretized corresponding time variables and by relaxing the one or more constraints to yield a relaxed constraint;

calculating, by the server, an optimized supply chain plan for the approximated linear programming problem, the optimized supply chain plan describing a quantity of items at each buffer for at least one time value of the corresponding time variable and including a list of producers configured to supply the items to each buffer; and adjusting, by the server, the optimized supply chain plan to satisfy the one or more constraints, wherein adjusting the optimized supply chain plan comprises:

repeating the following until a last upstream buffer is reached:
selecting a buffer;
sorting the list of producers in order of preference according to the optimized supply chain plan and the amount of items across a time horizon that each producer may be able to supply;
selecting a producer from the list;
determining whether the producer selected is capable of producing all, some, or none of the quantity of items at the buffer;
adjusting one of (a) the quantity of items at the selected buffer, and (b) at least one time value of the corresponding time variable of the selected buffer, to satisfy the one or more constraints; and
proceeding to a next upstream buffer; and repeating the following until a last downstream buffer is reached:
selecting a buffer;
determining whether there is a remaining quantity of items to be produced;
deciding whether to delay delivery or delay planning to the next buffer based on the determining whether there is a remaining quantity of items to be produced and delaying planning of the remaining quantity until a next buffer or delay delivery in accordance with the decision;
determining whether there is a next downstream buffer;
planning production to either (a) supply the items to the selected buffer at the adjusted time value, or (b) supply the adjusted quantity of items to the selected buffer; and
proceeding to a next downstream buffer; and generating, by the server, an order plan by planning production to supply the quantity of items to each buffer according to the list of producers associated with the buffer.

2. The method of claim 1, wherein adjusting the optimized supply chain plan comprises adjusting at least one time value of a corresponding time variable of at least one buffer to satisfy the lead time constraint.

3. The method of claim 1, wherein adjusting the optimized supply chain plan comprises adjusting at least one time value of a corresponding time variable of at least one buffer to satisfy a feasible time constraint.

4. The method of claim 1, wherein adjusting the optimized supply chain plan comprises adjusting a quantity of items of at least one buffer to satisfy the lot size constraint.

5. The method of claim 1, wherein adjusting the optimized supply chain plan comprises adjusting a quantity of items of at least one buffer to satisfy the capacity constraint.

6. The method of claim 1, wherein generating the order plan comprises repeating the following until a last upstream buffer is reached:
selecting a buffer that requires a quantity of items;
planning production to supply the quantity of items to the selected buffer using at least some of the producers from the list of producers associated with the buffer; and
proceeding to a next upstream buffer.

7. The method of claim 1, wherein generating the order plan comprises repeating the following until production to supply a quantity of items to a buffer is planned:
selecting a producer from the list of producers associated with the buffer;
planning production to supply at least some of the items to the buffer using the producer;
determining a remaining quantity of items required by the buffer; and
proceeding to a next producer on the list.

8. The method of claim 1, wherein generating the order plan comprises repeating the following until production to supply a quantity of items to a buffer is planned:
selecting a producer from the list of producers associated with the buffer;
planning production to supply at least some of the quantity of items to the buffer using the producer;
proceeding to a next producer on the list if there is a next producer; and
planning production regardless of the list if there is no next producer.

9. The method of claim 1, wherein generating the order plan comprises repeating the following if a quantity of items cannot be supplied to a buffer by a deadline, until the quantity of items for the buffer is planned:

selecting a producer from the list of producers associated with the buffer, the producers configured to supply the items to the buffer after the deadline;

planning production to supply at least some of the quantity of items to the buffer using the selected producer; and proceeding to a next producer on the list.

10. The method of claim 1, wherein generating the order plan comprises repeating the following if a quantity of items cannot be supplied to a buffer by a deadline, until the quantity of items for the buffer is planned:

selecting a supply time according to the list of producers associated with the buffer, the producers configured to supply the items to the buffer at one or more supply times after the deadline;

planning production to supply at least some of the quantity of items to the buffer using a producer configured to supply the items at the selected supply time; and proceeding to a next supply time.

11. The method of claim 1, further comprising planning production and removing the selected producer from the list if it is determined that the selected producer is capable of producing all of the quantity of items at the buffer.

12. The method of claim 1, further comprising determining whether there is a next producer if it is determined that the selected producer is capable of producing none of the quantity of items at the buffer.

13. The method of claim 1, further comprising planning partial production and updating the quantity of items at the buffer to reflect a partial quantity provided by the selected producer if it is determined that the selected producer is capable of producing some of the quantity of items at the buffer.

14. The method of claim 1, further comprising, if it is determined that the selected producer is capable of producing some or none of the quantity of items at the buffer, performing the acts comprising:

determining whether there is a next producer on the list; and if it is determined that there is a next producer on the list, selecting the next producer.

15. The method of claim 1, further comprising, if it is determined that the selected producer is capable of producing some or none of the quantity of items at the buffer, performing the acts comprising:

determining whether there is a next producer on the list wherein:

if it is determined that there is a not a next producer on the list, performing the acts comprising:

generating a list of producers that is sorted in order of preference and chronological order;

selecting a producer from the list;

planning production to satisfy one or more constraints using the selected producer; and determining whether all items have been produced wherein:

if it is determined that all items have been produced, determining whether there is a next buffer; and if it is determined that less than all items have been produced, determining whether there is a next producer on the list and performing the acts comprising:

selecting the next producer and determining whether there is a next buffer if it is determined that there is a next producer; and determining whether there is a next buffer if it is determined that there is not a next producer on the list.

16. The method of claim 1, further comprising:

generating a list of producers that is sorted in order of preference and chronological order, the list describing the producers and supply times at which the producers may provide items to the buffer;

selecting a supply time from the list;

planning production to satisfy one or more constraints using a producer capable of supplying items at the selected supply time; and determining whether all items have been produced wherein:

if it is determined that all items have been produced, determining whether there is a next buffer; and if it is determined that less than all items have been produced, determining whether there is a next supply time on the list wherein:

if it is determined that there is a next supply time on the list, selecting a next supply time and determining whether there is a next buffer; and if it is determined that there is not a next supply time on the list, determining whether there is a next buffer.

17. The method of claim 1, further comprising:

generating the order plan regardless of supply chain recommendations; and determining whether there is a next buffer.

18. A system of generating a supply chain plan and using the supply chain plan to generate an order plan, comprising:

a database configured to store data describing a supply chain network comprising a plurality of buffers, each buffer configured to store a plurality of items and associated with a corresponding time variable, the supply chain network constrained by a one or more constraints selected from the group consisting of a lead time constraint, a lot size constraint and a capacity constraint;

a linear programming optimizer coupled with the database and configured to:

generate a linear programming problem for the supply chain network;

approximate the linear programming problem by discretizing the corresponding time variables of the buffers to yield a plurality of discretized corresponding time variables and by relaxing the one or more constraints to yield a relaxed constraint; and calculate an optimized supply chain plan for the approximated linear programming problem, the optimized supply chain plan describing a quantity of items at each buffer for at least one time value of the corresponding time variable and including a list of producers configured to supply the items to each buffer; and a heuristic solver coupled with the database and configured to adjust the optimized supply chain plan to satisfy the one or more constraints, wherein the heuristic solver is configured to adjust the optimized supply chain plan by:

repeating the following until a last upstream buffer is reached:

selecting a buffer;

sorting the list of producers in order of preference according to the optimized supply chain plan and the amount of items across a time horizon that each producer may be able to supply;

selecting a producer from the list;

determining whether the producer selected is capable of producing all, some, or none of the quantity of items at the buffer;

adjusting one of (a) the quantity of items at the selected buffer, and (b) at least one time value of the corresponding time variable of the selected buffer to satisfy the one or more constraints; and proceeding to a next upstream buffer; and repeating the following until a last downstream buffer is reached:

selecting a buffer;

determining whether there is a remaining quantity of items to be produced;

deciding whether to delay delivery or delay planning to the next buffer based on the determining whether there is a remaining quantity of items to be produced and delaying planning of the remaining quantity until a next buffer or delay delivery in accordance with the decision;

determining whether there is a next downstream buffer;

planning production to either (a) supply the items to the selected buffer at the adjusted time value, or (b) supply the adjusted quantity of items to the selected buffer; and proceeding to a next downstream buffer; and an order planner coupled with the database and configured to generate an order plan by planning production to supply the quantity of items to each buffer according to the list of producers associated with the buffer.

19. The system of claim 18, wherein the heuristic solver is configured to adjust the optimized supply chain plan by adjusting at least one time value of a corresponding time variable of at least one buffer to satisfy the lead time constraint.

20. The system of claim 18, wherein the heuristic solver is configured to adjust the optimized supply chain plan by adjusting at least one time value of a corresponding time variable of at least one buffer to satisfy a feasible time constraint.

21. The system of claim 18, wherein the heuristic solver is configured to adjust the optimized supply chain plan by adjusting a quantity of items of at least one buffer to satisfy the lot size constraint.

22. The system of claim 18, wherein the heuristic solver is configured to adjust the optimized supply chain plan by adjusting a quantity of items of at least one buffer to satisfy the capacity constraint.

23. The system of claim 18, wherein the order planner is configured to repeat the following until a last upstream buffer is reached:

selecting a buffer that requires a quantity of items;

planning production to supply the quantity of items using at least some of the producers from the list of producers associated with the buffer; and proceeding to a next upstream buffer.

24. The system of claim 18, wherein the order planner is configured to repeat the following until production to supply a quantity of items to a buffer is planned:

selecting a producer from the list of producers associated with the buffer; planning production to supply at least some of the items to the buffer using the producer; determining a remaining quantity of items required by the buffer; and proceeding to a next producer on the list.

25. The system of claim 18, wherein the order planner is configured to repeat the following until production to supply a quantity of items to a buffer is planned:

selecting a producer from the list of producers associated with the buffer;

planning production to supply at least some of the quantity of items to the buffer using the producer;

proceeding to a next producer on the list if there is a next producer; and planning production regardless of the list if there is no next producer.

26. The system of claim 18, wherein the order planner is configured generate the order plan by repeating the following if a quantity of items cannot be supplied to a buffer by a deadline, until the quantity of items for the buffer is planned:

selecting a producer from the list of producers associated with the buffer, the producers configured to supply the items to the buffer after the deadline;

planning production to supply at least some of the quantity of items to the buffer using the selected producer; and proceeding to a next producer on the list.

27. The system of claim 18, wherein the order planner is configured to generate the order plan by repeating the following if a quantity of items cannot be supplied to a buffer by a deadline, until the quantity of items for the buffer is planned:

selecting a supply time according to the list of producers associated with the buffer, the producers configured to supply the items to the buffer at one or more supply times after the deadline;

planning production to supply at least some of the quantity of items to the buffer using the producer configured to supply the items at the selected supply time; and proceeding to a next supply time.

28. The system of claim 18, wherein the heuristic solver is further configured to adjust the optimized supply chain plan by planning production and removing the selected producer from the list if it is determined that the selected producer is capable of producing all of the quantity of items at the buffer.

29. The system of claim 18, wherein the heuristic solver is further configured to adjust the optimized supply chain plan by determining whether there is a next producer if it is determined that the selected producer is capable of producing none of the quantity of items at the buffer.

30. The system of claim 18, wherein the heuristic solver is further configured to adjust the optimized supply chain plan by planning partial production and updating the quantity of items at the buffer to reflect a partial quantity provided by the selected producer if it is determined that the selected producer is capable of producing some of the quantity of items at the buffer.

31. The system of claim 18, wherein the heuristic solver is further configured to adjust the optimized supply chain plan if it is determined that the selected producer is capable of producing some or none of the quantity of items at the buffer, by performing the acts comprising:

determining whether there is a next producer on the list; and if it is determined that there is a next producer on the list, selecting the next producer.

32. The system of claim 18, wherein the heuristic solver is further configured to adjust the optimized supply chain plan if it is determined that the selected producer is capable of producing some or none of the quantity of items at the buffer, by performing the acts comprising:

determining whether there is a next producer on the list wherein:

if it is determined that there is a not a next producer on the list, performing the acts comprising:

generating a list of producers that is sorted in order of preference and chronological order;

selecting a producer from the list;
planning production to satisfy one or more constraints using the selected producer; and
determining whether all items have been produced wherein:
if it is determined that all items have been produced, determining whether there is a next buffer; and
if it is determined that less than all items have been produced, determining whether there is a next producer on the list and performing the acts comprising:
selecting the next producer and determining whether there is a next buffer if it is determined that there is a next producer; and
determining whether there is a next buffer if it is determined that there is not a next producer on the list.

33. The system of claim 18, wherein the heuristic solver is further configured to adjust the optimized supply chain plan by:
generating a list of producers that is sorted in order of preference and chronological order, the list describing the producers and supply times at which the producers may provide items to the buffer;
selecting a supply time from the list;
planning production to satisfy one or more constraints using a producer capable of supplying items at the selected supply time; and
determining whether all items have been produced wherein:
if it is determined that all items have been produced, determining whether there is a next buffer; and
if it is determined that less than all items have been produced, determining whether there is a next supply time on the list wherein:
if it is determined that there is a next supply time on the list, selecting a next supply time and determining whether there is a next buffer; and
if it is determined that there is not a next supply time on the list, determining whether there is a next buffer.

34. The system of claim 18, wherein the heuristic solver is further configured to adjust the optimized supply chain plan by:
generating the order plan regardless of supply chain recommendations; and
determining whether there is a next buffer.

35. Logic for generating a supply chain plan and using the supply chain plan to generate an order plan, the logic encoded in a computer-readable medium and when executed by a computer configured to:
access data describing a supply chain network comprising a plurality of buffers, each buffer configured to store a plurality of items and associated with a corresponding time variable, the supply chain network constrained by a one or more constraints selected from the group consisting of a lead time constraint, a lot size constraint, and a capacity constraint;
generate a linear programming problem for the supply chain network;
approximate the linear programming problem by discretizing the corresponding time variables of the buffers to yield a plurality of discretized corresponding time variables and by relaxing the one or more constraints to yield a relaxed constraint;
calculate an optimized supply chain plan for the approximated linear programming problem, the optimized supply chain plan describing a quantity of items at each buffer for at least one time value of the corresponding time variable and including a list of producers configured to supply the items to each buffer; and
adjust the optimized supply chain plan to satisfy the one or more constraints, the logic configured to adjust the optimized supply chain plan by:
repeating the following until a last upstream buffer is reached:
selecting a buffer;
sorting the list of producers in order of preference according to the optimized supply chain plan and the amount of items across a time horizon that each producer may be able to supply;
selecting a producer from the list;
determining whether the producer selected is capable of producing all, some, or none of the quantity of items at the buffer;
adjusting one of (a) the quantity of items at the selected buffer, and (b) at least one time value of the corresponding time variable of the selected buffer, to satisfy the constraint; and
proceeding to a next upstream buffer; and
repeating the following until a last downstream buffer is reached:
selecting a buffer;
determining whether there is a remaining quantity of items to be produced;
deciding whether to delay delivery or delay planning to the next buffer based on the determining whether there is a remaining quantity of items to be produced and delaying planning of the remaining quantity until a next buffer or delay delivery in accordance with the decision;
determining whether there is a next downstream buffer;
planning production to either (a) supply the items to the selected buffer at the adjusted time value, or (b) supply the adjusted quantity of items to the selected buffer; and
proceeding to a next downstream buffer; and
generate an order plan by planning production to supply the quantity of items to each buffer according to the list of producers associated with the buffer.

36. The logic of claim 35, the logic configured to adjust the optimized supply chain plan by adjusting at least one time value of a corresponding time variable of at least one buffer to satisfy the lead time constraint.

37. The logic of claim 35, the logic configured to adjust the optimized supply chain plan by adjusting at least one time value of a corresponding time variable of at least one buffer to satisfy a feasible time constraint.

38. The logic of claim 35, the logic configured to adjust the optimized supply chain plan by adjusting a quantity of items of at least one buffer to satisfy the lot size constraint.

39. The logic of claim 35, the logic configured to adjust the optimized supply chain plan by adjusting a quantity of items of at least one buffer to satisfy the capacity constraint.

40. The logic of claim 35, the logic configured to generate the order plan by repeating the following until a last upstream buffer is reached:
selecting a buffer that requires a quantity of items;
planning production to supply the quantity of items to the selected buffer using at least some of the producers from the list of producers associated with the buffer; and
proceeding to a next upstream buffer.

41. The logic of claim 35, the logic configured to generate the order plan by repeating the following until production to supply a quantity of items to a buffer is planned:
- selecting a producer from the list of producers associated with the buffer;
- planning production to supply at least some of the items to the buffer using the producer;
- determining a remaining quantity of items required by the buffer; and
- proceeding to a next producer on the list.

42. The logic of claim 35, the logic configured to generate the order plan by repeating the following until production to supply a quantity of items to a buffer is planned:
- selecting a producer from the list of producers associated with the buffer;
- planning production to supply at least some of the quantity of items to the buffer using the producer;
- proceeding to a next producer on the list if there is a next producer; and
- planning production regardless of the list if there is no next producer.

43. The logic of claim 35, the logic configured to generate the order plan by repeating the following if a quantity of items cannot be supplied to a buffer by a deadline, until the quantity of items for the buffer is planned:
- selecting a producer from the list of producers associated with the buffer, the producers configured to supply the items to the buffer after the deadline;
- planning production to supply at least some of the quantity of items to the buffer using the selected producer; and
- proceeding to a next producer on the list.

44. The logic of claim 35, the logic configured to generate the order plan by repeating the following if a quantity of items cannot be supplied to a buffer by a deadline, until the quantity of items for the buffer is planned:
- selecting a supply time according to the list of producers associated with the buffer, the producers configured to supply the items to the buffer at one or more supply times after the deadline;
- planning production to supply at least some of the quantity of items to the buffer using a producer configured to supply the items at the selected supply time; and
- proceeding to a next supply time.

45. The logic of claim 35, further configured to adjust the optimized supply chain plan by planning production and removing the selected producer from the list if it is determined that the selected producer is capable of producing all of the quantity of items at the buffer.

46. The logic of claim 35, further configured to adjust the optimized supply chain plan by determining whether there is a next producer if it is determined that the selected producer is capable of producing none of the quantity of items at the buffer.

47. The logic of claim 35, further configured to adjust the optimized supply chain plan by planning partial production and updating the quantity of items at the buffer to reflect a partial quantity provided by the selected producer if it is determined that the selected producer is capable of producing some of the quantity of items at the buffer.

48. The logic of claim 35, further configured to adjust the optimized supply chain plan if it is determined that the selected producer is capable of producing some or none of the quantity of items at the buffer, by performing the acts comprising:
- determining whether there is a next producer on the list; and
- if it is determined that there is a next producer on the list, selecting the next producer.

49. The logic of claim 35, further configured to adjust the optimized supply chain plan if it is determined that the selected producer is capable of producing some or none of the quantity of items at the buffer, by performing the acts comprising:
- determining whether there is a next producer on the list wherein:
  - if it is determined that there is a not a next producer on the list, performing the acts comprising:
    - generating a list of producers that is sorted in order of preference and chronological order;
    - selecting a producer from the list;
    - planning production to satisfy one or more constraints using the selected producer; and
    - determining whether all items have been produced wherein:
      - if it is determined that all items have been produced, determining whether there is a next buffer; and
      - if it is determined that less than all items have been produced, determining whether there is a next producer on the list and performing the acts comprising:
        - selecting the next producer and determining whether there is a next buffer if it is determined that there is a next producer; and
        - determining whether there is a next buffer if it is determined that there is not a next producer on the list.

50. The logic of claim 35, further configured to adjust the optimized supply chain plan by:
- generating a list of producers that is sorted in order of preference and chronological order, the list describing the producers and supply times at which the producers may provide items to the buffer;
- selecting a supply time from the list;
- planning production to satisfy one or more constraints using a producer capable of supplying items at the selected supply time; and
- determining whether all items have been produced wherein:
  - if it is determined that all items have been produced, determining whether there is a next buffer; and
  - if it is determined that less than all items have been produced, determining whether there is a next supply time on the list wherein:
    - if it is determined that there is a next supply time on the list, selecting a next supply time and determining whether there is a next buffer; and
    - if it is determined that there is not a next supply time on the list, determining whether there is a next buffer.

51. The logic of claim 35, further configured to adjust the optimized supply chain plan by:
- generating the order plan regardless of supply chain recommendations; and
- determining whether there is a next buffer.

52. A system for generating a supply chain plan and using the supply chain plan to generate an order plan, comprising:
- means for accessing data describing a supply chain network comprising a plurality of buffers, each buffer configured to store a plurality of items and associated with a corresponding time variable, the supply chain network constrained by a one or more constraints selected from the group consisting of a lead time constraint, a lot size constraint, and a capacity constraint;

means for generating a linear programming problem for the supply chain network;

means for approximating the linear programming problem by discretizing the corresponding time variables of the buffers to yield a plurality of discretized corresponding time variables and by relaxing the one or more constraints to yield a relaxed constraint;

means for calculating an optimized supply chain plan for the approximated linear programming problem, the optimized supply chain plan describing a quantity of items at each buffer for at least one time value of the corresponding time variable and including a list of producers configured to supply the items to each buffer; and means for adjusting the optimized supply chain plan to satisfy the one or more constraints, wherein adjusting the optimized supply chain plan comprises:

repeating the following until a last upstream buffer is reached:
  selecting a buffer;
  sorting the list of producers in order of preference according to the optimized supply chain plan and the amount of items across a time horizon that each producer may be able to supply;
  selecting a producer from the list;
  determining whether the producer selected is capable of producing all, some, or none of the quantity of items at the buffer;
  adjusting one of (a) the quantity of items at the selected buffer, and (b) at least one time value of the corresponding time variable of the selected buffer, to satisfy the constraint; and
  proceeding to a next upstream buffer; and repeating the following until a last downstream buffer is reached:
  selecting a buffer;
  determining whether there is a remaining quantity of items to be produced;
  deciding whether to delay delivery or delay planning to the next buffer based on the determining whether there is a remaining quantity of items to be produced and delaying planning of the remaining quantity until a next buffer or delay delivery in accordance with the decision;
  determining whether there is a next downstream buffer;
  planning production to either (a) supply the items to the selected buffer at the adjusted time value, or (b) supply the adjusted quantity of items to the selected buffer; and
  proceeding to a next downstream buffer; and means for generating an order plan by planning production to supply the quantity of items to each buffer according to the list of producers associated with the buffer.

53. A computer-implemented method of generating a supply chain plan and using the supply chain plan to generate an order plan, comprising:

accessing, by a server, data in a database describing a supply chain network comprising a plurality of buffers, each buffer configured to store a plurality of items and associated with a corresponding time variable, the supply chain network constrained by a plurality of one or more constraints selected from the group consisting of a lead time constraint, a lot size constraint, and a capacity constraint;

generating, by the server, a linear programming problem for the supply chain network;

approximating, by the server, the linear programming problem by discretizing the corresponding time variables of the buffers to yield a plurality of discretized corresponding time variables and by relaxing the one or more constraints to yield a plurality of relaxed constraints;

calculating, by the server, an optimized supply chain plan for the approximated linear programming problem, the optimized supply chain plan describing a quantity of items at each buffer for at least one time value of the corresponding time variable and including a list of producers configured to supply the items to each buffer;

generating, by the server, an order plan by planning production to supply the quantity of items to each buffer according to the list of producers associated with the buffer; and adjusting, by the server, the optimized supply chain plan to satisfy the one or more constraints, by repeating the following until a last upstream buffer is reached:
  selecting a buffer, adjusting at least one time value of the corresponding time variable of the selected buffer to satisfy the lead time constraint, adjusting the quantity of items at the selected buffer to satisfy the lot size constraint, and proceeding to a next upstream buffer; and repeating the following until a last downstream buffer is reached:
  selecting a buffer, planning production to supply the adjusted quantity of items to the selected buffer at the adjusted time value, and proceeding to a next downstream buffer.

54. The method of claim 53, wherein generating the order plan comprises repeating the following until production to supply a quantity of items to a buffer is planned:

selecting a producer from the list of producers associated with the buffer, planning production to supply at least some of the items to the buffer using the producer, determining a remaining quantity of items required by the buffer, and proceeding to a next producer on the list.

* * * * *